(12) United States Patent
Cosgrove et al.

(10) Patent No.: US 6,304,765 B1
(45) Date of Patent: Oct. 16, 2001

(54) FOLDABLE COMMUNICATION DEVICE AND METHOD

(75) Inventors: Steven John Cosgrove; Kim Hock Lim, both of Singapore (SG)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/440,961

(22) Filed: Nov. 16, 1999

(51) Int. Cl.$^7$ .................................................. H04M 1/00
(52) U.S. Cl. ........................... 455/575; 455/550; 455/90; 340/7.57; 340/7.58; 340/7.59; 379/433
(58) Field of Search ..................... 455/567, 550, 455/90, 575, 566; 340/7.57, 7.58, 7.59, 7.62; 379/433, 434

(56) References Cited

U.S. PATENT DOCUMENTS

| | | |
|---|---|---|
| 4,405,839 | 9/1983 | Groff . |
| 5,337,356 * | 8/1994 | Shinozaki .............................. 379/418 |
| 5,404,391 | 4/1995 | Wavroch et al. . |
| 5,448,620 * | 9/1995 | Gershkovich et al. ................ 379/58 |
| 5,638,441 * | 6/1997 | Hattori et al. ........................ 379/433 |
| 5,751,804 * | 5/1998 | Mendolia .............................. 379/433 |
| 5,995,852 * | 11/1999 | Yasuda et al. ........................ 455/567 |
| 6,006,114 * | 12/1999 | Seppanen et al. .................... 455/567 |
| 6,044,279 * | 3/2000 | Hokao et al. ......................... 455/567 |
| 6,094,565 * | 7/2000 | Alberth et al. ........................ 455/90 |
| 6,151,486 * | 11/2000 | Holshouser et al. .................. 455/90 |
| 6,215,993 * | 4/2001 | Ulveland ............................... 455/415 |
| 6,233,462 * | 5/2001 | Kanai ................................... 455/550 |

* cited by examiner

Primary Examiner—Daniel Hunter
Assistant Examiner—Lana Le
(74) Attorney, Agent, or Firm—Daniel R. Collopy

(57) ABSTRACT

A foldable communication device (10) with a housing having two portions (11,12) pivotably mounted to each other to allow relative movement therebetween. This relative movement is about an axis (13) and enabled by mounting portion (11) to two mounts (14,15) of portion (12). Device (10) has a transceiver (17) housed in the housing, an alert transducer (18) associated with transceiver (17) to provide an audible alert at a predetermined volume when a communication call for device (10) is received by transceiver (17) and a controller (19) coupled to transducer (18). In response to the relative movement of portions (11,12), controller (19) reduces the volume of the audible alert without the communication call being answered.

18 Claims, 4 Drawing Sheets

FOLDABLE COMMUNICATION DEVICE AND METHOD

FIELD OF THE INVENTION

This invention relates to foldable communication devices such as mobile phones or two-way radios with alerts to alert users to communication calls for such devices. In particular, this invention relates to foldable communication devices with two-part housings that are movable to automatically reduce volume of audible alerts when communication calls are received.

BACKGROUND OF THE INVENTION

Communication devices, such as mobile phones or two-way radios, are known to have alerts to alert a user to a communication call. These alerts can be audible, tactile, visual alerts or a combination of such alerts. Conventionally, alerts can be selected for a communication device according to a user's preferences. Once selected, the alerts are then provided in response to communication calls addressing the device.

Audible alerts can be annoying and disruptive to people attending, for example, meetings or classes. Although tactile or visual alerts are possible alternatives, such tactile or visual alerts are not effective when a user cannot sense them. For example, tactile or visual alerts are generally ineffective if, for example, a mobile phone with these alerts is placed out of the user's sight or feel such as in a handbag. Consequently, audible alerts are sometimes preferred and the user will quickly answer a communication call to avoid the audible alerts annoying others.

In some communication devices, an electronic display is enclosed within folded or covered portions of a housing. Users of such devices have to unfold or uncover such portions in order to answer communication calls. To shorten a time duration in which it takes the user to answer a communication call, unfolding or uncovering the portions to thereby reveal the display automatically connect the user to a calling party. However, there are times when the user wants to review indicia displayed on the display and identify the calling party before answering a communication call.

SUMMARY OF THE INVENTION

According to one aspect of the invention, there is provided a foldable communication device comprising:
  a housing having at least two portions pivotably mounted to each other to allow relative movement therebetween;
  a transceiver housed in said housing;
  an alert transducer associated with said transceiver;
  a controller coupled to said transducer,
  wherein, in use, said transducer provides an audible alert having a predetermined volume when a communication call for said device is received by said transceiver and wherein, in response to said relative movement, said volume of said audible alert is reduced without said communication call being answered.

According to another aspect of the invention, there is provided a method to control an audible alert of a foldable communication device, said device having a housing with two portions pivotably mounted to each other, said method comprising the steps of:
  receiving an alert request in response to reception of a communication call for said device;
  determining respective positions of said portions based on relative movement of said portions, said positions being a closed position and an open position; and
  controlling, in response to said step of determining, a predetermined volume of an audible alert without said communication call being answered.

BRIEF DESCRIPTION OF THE DRAWINGS

In order to describe the invention and to put it into practical effect, reference will now be made to preferred embodiments of the invention as illustrated with reference to the accompanying drawings in which.

DETAILED DESCRIPTION OF THE INVENTION

Figure 1:
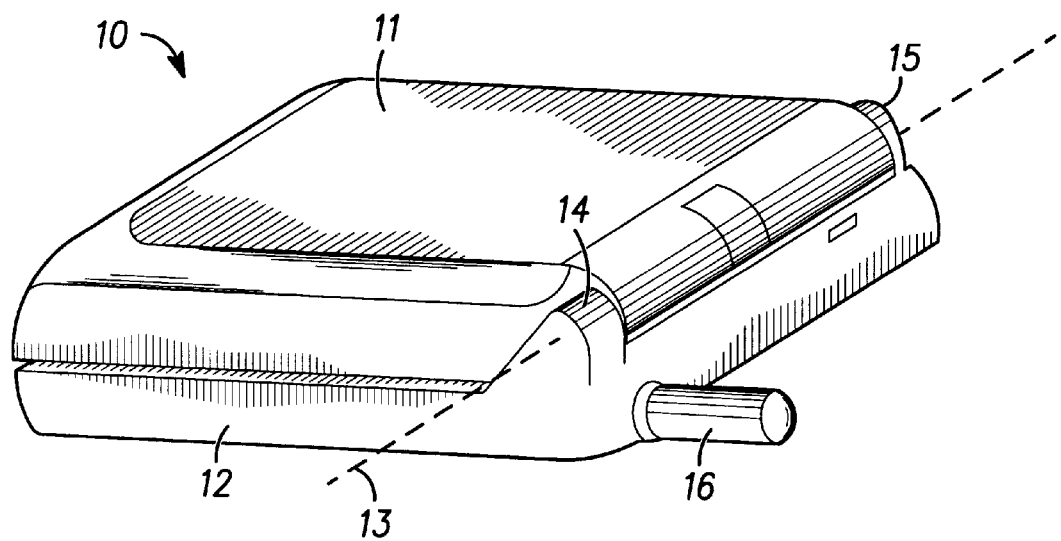
FIG. 1 is a perspective view of a foldable communication device in a closed position according to a first embodiment of the invention.

Referring now to FIG. 1, a perspective of a foldable communication device 10 in a closed position is shown according to a first embodiment of the invention. Device 10 comprises a housing having two portions 11,12 pivotably mounted to each other to allow relative movement therebetween. The relative movement is about an axis 13 and enabled by mounting portion 11 to two mounts 14,15 of portion 12 using two pivot pins (not shown). Also mounted to portion 12 is an antenna 16 to receive communication calls for device 10.

Figure 2:
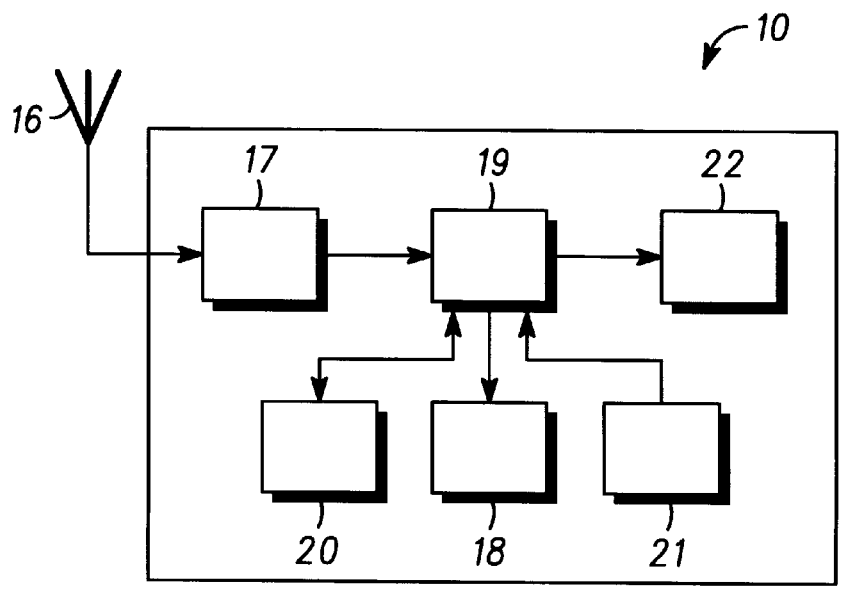
FIG. 2 is a schematic block diagram illustrating basic electrical components of the device of FIG. 1.

The communication calls received via antenna 16 are processed within device 10. Basic electrical components of device 10 are illustrated with a schematic block diagram in FIG. 2. As illustrated, device 10 also comprises a transceiver 17 housed in the housing, an alert transducer 18 associated with transceiver 17, and a controller 19 coupled to transducer 18. Transducer 18 provides audible alerts having a predetermined volume when a communication call for device 10 is received by transceiver 17. Device 10 further comprises a user input 20, a detector 21 to detect the relative movement between portions 11,12 and an electronic display 22 mounted to the housing for displaying indicia associated with the communication call. Such indicia include, for example, information identifying a calling party. User input 20 can be a keypad from which the predetermined volume is adjustable by a user of device 10 as is known in the art. Detector 21 has an output coupled to controller 19 and can be implemented with, for example, a switch coupled to the housing so that the relative movement of portions 11,12 actuates the switch to provide a signal to controller 19. One type of switch that is suitable for this purpose is a magnetically activated switch, such as a reed switch. This reed switch can be mounted to portion 12 to coact with, for example, a magnet of a speaker that is mounted to portion 11 such that it is activated when both portions 11,12 are close to each other.

Figure 3:
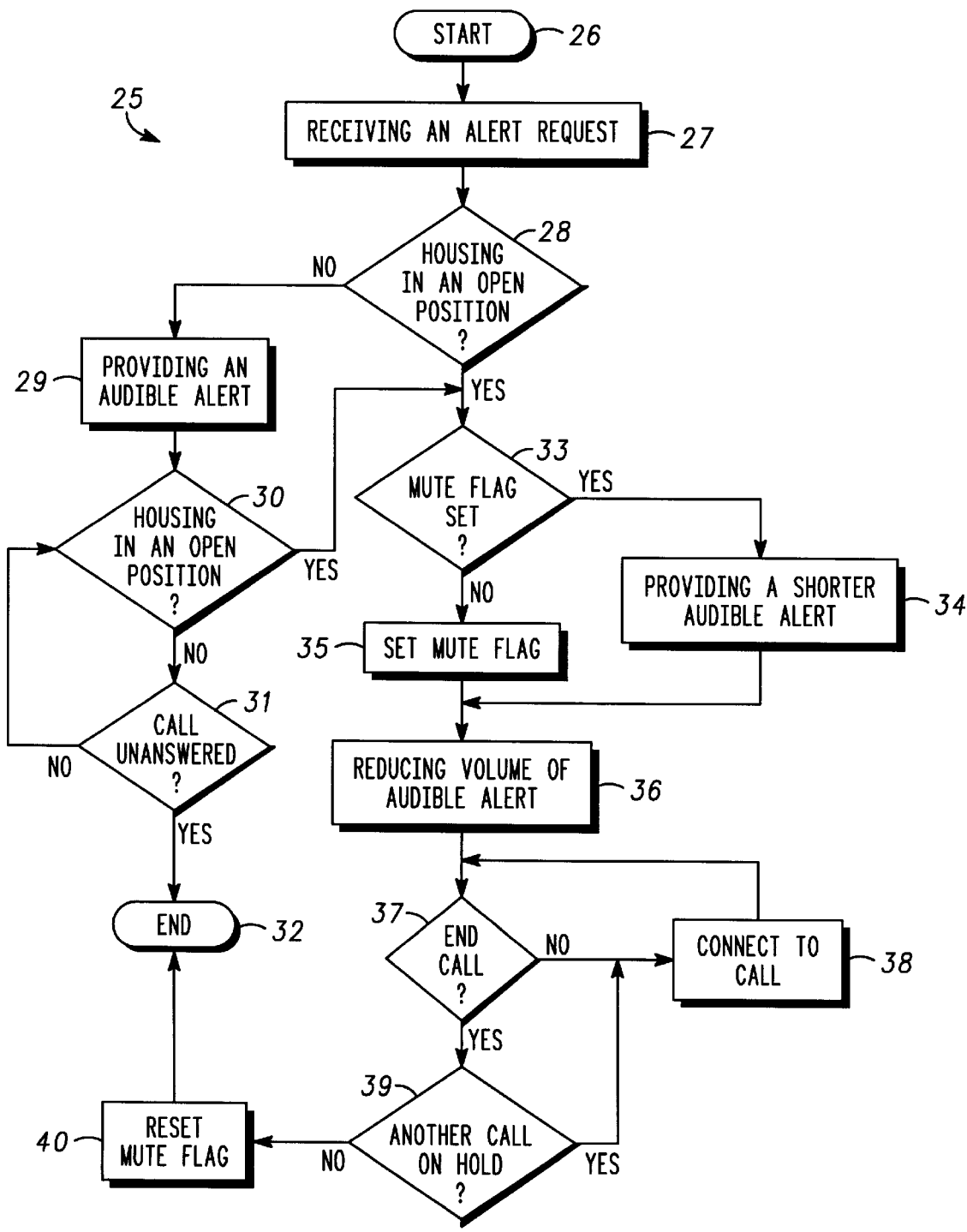
FIG. 3 is a flow diagram of a method to control an audible alert of the device of FIG.1.
Figure 4:
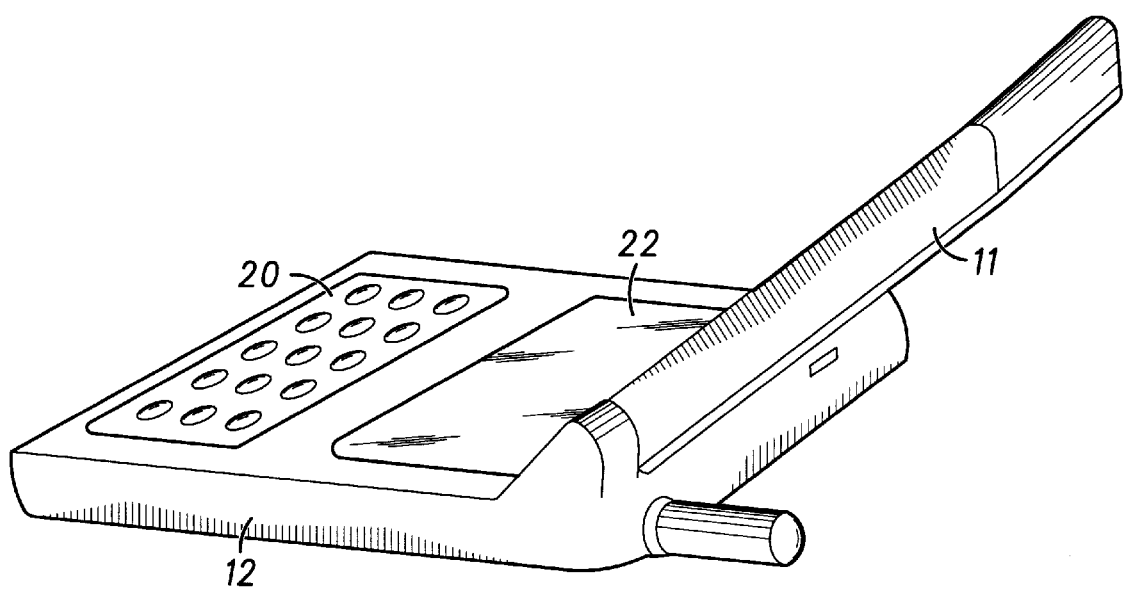
FIG. 4 is a perspective view of FIG. 1 in an open position.

Use of device 10 is illustrated in FIG. 3 with a flow diagram showing a method 25 to control an audible alert of device 10. Starting at step 26, controller 19 receives an alert request in response to reception of a communication call for device 10 at step 27. With the alert request, controller 19 determines at decision step 28 whether the housing is in an open position. This open position is illustrated in FIG. 4 with portions 11,12 pivotably moved about axis 13 so that display 22 is viewable and user input 20 is actuatable by a user of device 10. Relative movement of portions 11,12 from a closed position shown in FIG. 1 to the open position is detected by detector 21. In the closed position shown in FIG. 1, display 22 is hidden from view and in the open position display 22 is viewable by the user. If the housing is not in the open position, then controller 19 activates transducer 18 to provide an audible alert at step 29. From step 29, and upon providing the audible alert, controller 19 checks whether the housing is in the open position at decision step 30. Decision step 30 indicates whether or not the user has opened the housing to answer the communication call. If "No" at decision step 30, that is with the housing still remaining in the closed position, controller 19 then determines whether the communication is to be regarded as an unanswered call at decision step 31. Typically, the communication call is regarded as an unanswered call after a predetermined time period has expired. Hence, when the predetermined time period has expired, controller 19 proceeds with a "Yes" from decision step 31 to end the communication call at step 32. Otherwise, when the predetermined time period has not expired, method 25 loops back to decision step 30.

Consequently, if the housing is in the open position as determined by controller 19 at either decision step 28 or decision step 30, method 25 proceeds to decision step 33 in which controller 19 determines whether a mute flag has been set. Proceeding with a "Yes" from decision step 33, controller 19 then controls transducer 18 to provide a shorter audible alert than normally provided, say, for example, at step 29. This shorter audible alert is at a reduced volume as the mute flag has already been set. Otherwise, with a "No" at decision step 33, method 25 proceeds to step 35 in which controller 19 sets the mute flag.

Thereafter, method 25 proceeds to step 36 from either step 34 or step 35. At step 36, controller 19 controls transducer 18 by reducing volume of the audible alert. This volume can be reduced either gradually or by muting. From step 36, method 25 continues to decision step 37 in which controller 19 checks whether to end the communication call. If the user decides to answer the communication call, then controller 19 connects to the communication call at step 38 and loops back to decision step 37. Otherwise, if the user decides not to answer the communication call, method 25 then checks whether another communication call is on hold at decision step 39. Checking for another communication call applies for device 10 having a feature commonly referred to as call waiting or call holding. If there is no other communication call on hold, controller 19 then resets the mute flag at step 40 and ends the communication call at step 32. Otherwise, with another communication call on hold, controller 19 ends a current communication call and connects to the another communication call at step 38. Method 25 then loops back to decision step 37 and continues as described above.

In the first embodiment described in the above, the volume of the audible alert is reduced by controller 19 detecting the relative movement between portions 11,12. A second embodiment in accordance with the invention will now be described in which the volume of the audible alert is mechanically muted. In describing the second embodiment shown in FIGS. 5 to 7, reference numbers used are the same as in device 10 for similar elements unless otherwise indicated.

Figure 5:
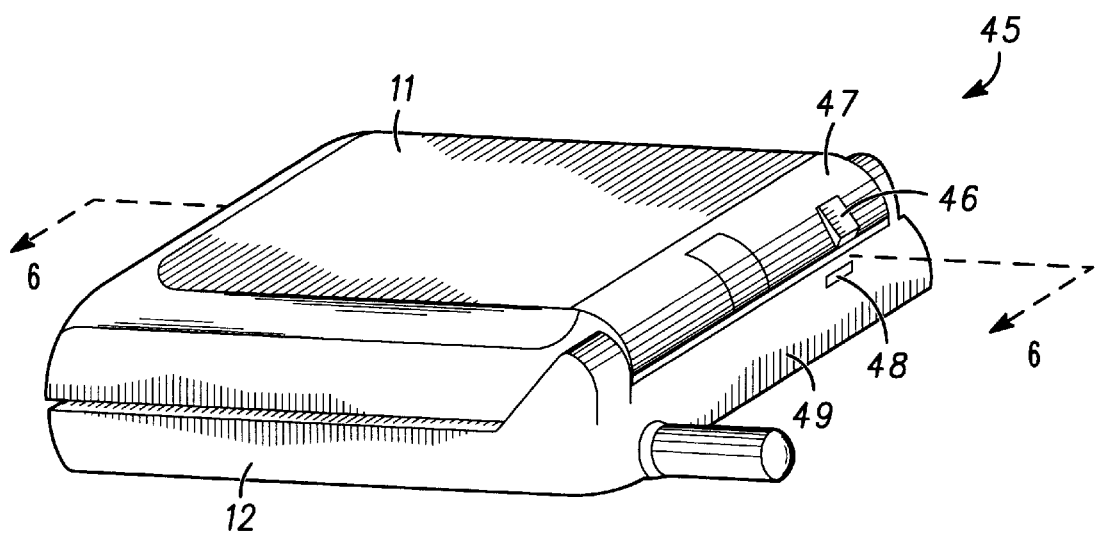
FIG. 5 is a perspective view of a foldable communication device in accordance with a second embodiment of the invention.
Figure 6:
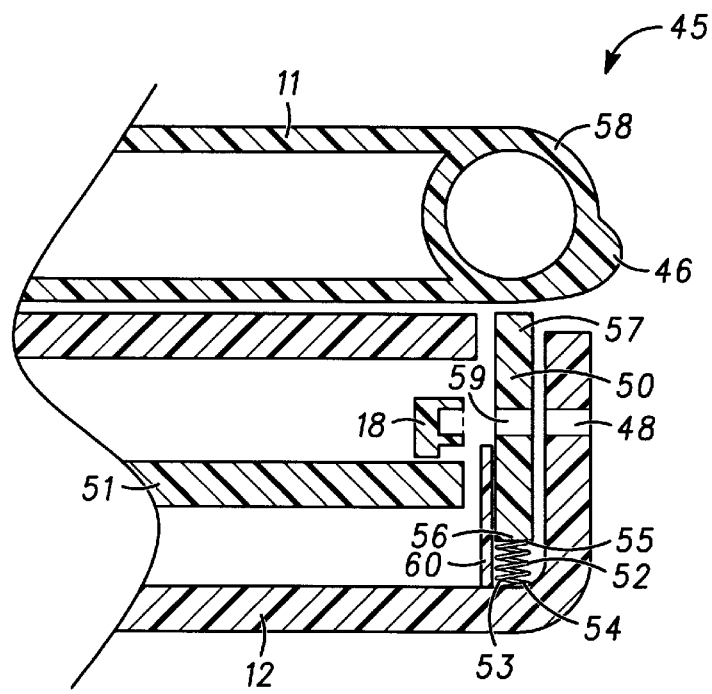
FIG. 6 is a cross section through A—A' of the device of FIG. 5 in a closed position.
Figure 7:
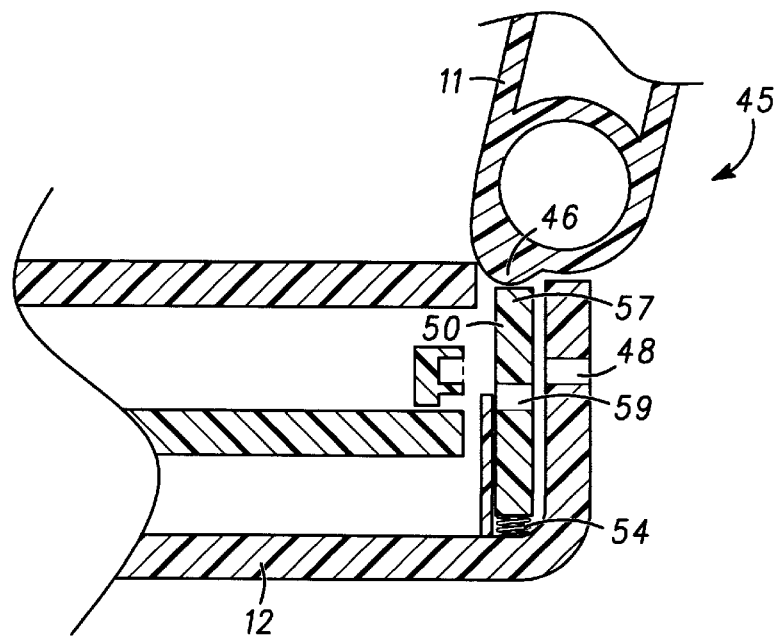
FIG. 7 illustrates the device as shown in FIG. 6 when in an open position.

Referring now to FIGS. 5 to 7, the second embodiment provides for a foldable communication device 45 having a cam 46 protruding from a surface 47 of portion 11. Cam 46 is associated with an outlet 48 on a surface 49 of portion 12. The volume of the audible alert provided by transducer 18 in device 45 is reduced with a mechanical shutter 50 that is movable in association with relative movement of portions 11,12 as will be described.

A cross-section of device 45 in a closed position through A—A' is shown in FIG. 6. At this closed position, cam 46 is angled away from the housing and portion 11 is substantially parallel with portion 12. Within portion 12 is a circuit board 51 on which transducer 18 is mounted. A spring 52 has one end 53 mounted to an inner surface 54 of portion 12 and an opposite end 55 coupled to one end 56 of shutter 50. An opposite end 57 of shutter 50 is biased against a mounted section 58 of portion 11 by spring 52. Shutter 50 has a shutter opening 59 that is aligned to outlet 48 when device 10 is in the closed position. Consequently, an audible alert from transducer 18 can be transmitted out of the housing through outlet 48 and opening 59 in this closed position. Also shown in FIG. 6 is a guide 60 for guiding movement of shutter 50 within portion 12.

Operation of shutter 50 to mute the audible alert starts when the user perceives the audible alert and moves portions 11,12 to the open position of the housing. In the open position as illustrated with a cross-section of device 45 in FIG. 7, cam 46 is now rotated to an inner position to coact with end 57 and thereby bias shutter 50 towards inner surface 54 and against spring 52. In this open position, shutter opening 59 is not aligned with housing outlet 48. Consequently, the audible alert from transducer 18 is blocked from being transmitted out of the housing as a result of shutter 50 covering, at least partially, outlet 48. Hence, the audible alert is muted and is therefore less likely to annoy others in the vicinity of device 45. When the housing returns to the closed position shown in FIG. 6, spring 52 again biases shutter 50 to align with outlet 48.

Advantageously, the invention enables a user to reduce or mute audible alerts from devices 10,45 simply by moving portions 11,12 of their respective housings to the open position. Therefore, the problem of the audible alerts annoying or disrupting others during meetings or classes is alleviated as such alerts are reduced or muted by the user. Also, the user can continue to use audible alerts instead of using tactile or visual alerts.

Additionally, with this invention, the user does not need to answer a communication call when moving portions 11,12 to the open position. In the open position, a communication call is not connected unless the user chooses to do so via actuating user input 20. Thus, the user is able to review indicia displayed on display 22 to thereby identify a calling party without noisy disruptions from the audible alerts. Thereafter, the user can choose whether or not to connect to the communication call.

Further, when connected to a current communication call, the user is not interrupted at the predetermined volume of an audible alert by another communication call. In this situation, the user will be alerted to the another communication call by a shorter audible alert at a reduced volume.

Although the invention has been described with reference to the above embodiments, it is to be understood that the invention is not restricted to the embodiments described herein.

What is claimed is:

1. A foldable communication device comprising:
    a housing having at least two portions pivotably mounted to each other to allow relative movement therebetween;
    a transceiver housed in said housing;
    an alert transducer associated with said transceiver;
    a controller coupled to said transducer,
    wherein, in use, said transducer provides an audible alert having a predetermined volume when a communication call for said device is received by said transceiver and wherein, in response to said relative movement, said volume of said audible alert is reduced without said communication call being answered.

2. The device as claimed in claim 1, wherein said relative movement is between a closed position and an open position.

3. The device as claimed in claim 2 further comprising an electronic display, wherein said display is hidden from view in said closed position and wherein said display is viewable when in said open position.

4. The device as claimed in claim 1 further comprising a detector to detect said relative movement.

5. The device as claimed in claim 2, wherein said detector has an output coupled to said controller.

6. The device as claimed in claim 2, wherein said detector is a switch.

7. The device as claimed in claim 4, wherein said switch is a magnetically activated switch.

8. The device as claimed in claim 1, wherein said predetermined volume is adjustable by a user of said device.

9. The device as claimed in claim 1 further comprising a mechanical shutter, said shutter being movable to at least partially cover an outlet of said housing, said outlet being associated with said transducer.

10. The device as claimed in claim 7, wherein said mechanical shutter is movable in association with said relative movement.

11. The device as claimed in claim 1, wherein said volume is reduced such that said audible alert is muted.

12. A method to control an audible alert of a foldable communication device, said device having a housing with two portions pivotably mounted to each other, said method comprising the steps of:
    receiving an alert request in response to reception of a communication call for said device;
    determining respective positions of said portions based on relative movement of said portions, said positions being a closed position and an open position; and
    controlling, in response to said step of determining, a predetermined volume of an audible alert without said communication call being answered.

13. The method as claimed in claim 12, wherein said step of controlling comprises the step of reducing said volume.

14. The method as claimed in claim 12, wherein said step of controlling comprises the step of muting said audible alert.

15. The method as claimed in claim 12, wherein said step of controlling comprises the step of determining whether a mute flag is set.

16. The method as claimed in claim 15, wherein said step of controlling further comprises the step of setting said mute flag.

17. The method as claimed in claim 12, wherein said step of controlling further comprises the step of checking whether to end said communication call.

18. The method as claimed in claim 15, wherein said step of controlling further comprises the step of resetting said mute flag when said communication call is ended.

* * * * *